United States Patent [19]

Segerström

[11] Patent Number: 4,637,787

[45] Date of Patent: Jan. 20, 1987

[54] HYDRAULIC SCREW MACHINE

[75] Inventor: Lars H. Segerström, Skärholmen, Sweden

[73] Assignee: IMO AB, Stockholm, Sweden

[21] Appl. No.: 744,614

[22] Filed: Jun. 14, 1985

[30] Foreign Application Priority Data

Jun. 20, 1984 [SE] Sweden ............................... 8403315

[51] Int. Cl.[4] ............................................. F04C 18/24
[52] U.S. Cl. ................................................. 418/203
[58] Field of Search ................. 418/203; 384/101, 102, 384/121, 124

[56] References Cited

U.S. PATENT DOCUMENTS

| 3,642,331 | 2/1972 | Silver | 384/102 |
| 3,932,073 | 1/1976 | Schibbye | 418/203 |
| 4,000,559 | 1/1977 | Korrenn | 384/101 |
| 4,028,025 | 6/1977 | Lonnebring | 418/203 |
| 4,131,400 | 12/1978 | Segerstrom | 418/203 |
| 4,394,091 | 7/1983 | Klomp | 384/102 |

Primary Examiner—Carlton R. Croyle
Assistant Examiner—Jane E. Obee
Attorney, Agent, or Firm—Banner, Birch, McKie & Beckett

[57] ABSTRACT

A hydraulic screw machine including a drive screw and at least one running screw co-operating therewith are arranged inside a housing, the drive screw being united with a shaft extending out through the housing at the high pressure side of the machine and being provided with a balancing piston for balancing a part of the axial force acting on the drive screw and also with a collar which together with a wall portion of the housing forms a hydrostatic axial bearing for taking up the remaining axial force acting on the drive screw. The bearing surfaces of the axial bearing are kept separated by a spring means during starting and similar operating conditions. An axially limitedly movable rolling bearing is mounted in association with the hydrostatic axial bearing and takes up axial forces on the drive screw occurring in certain operating conditions.

4 Claims, 2 Drawing Figures

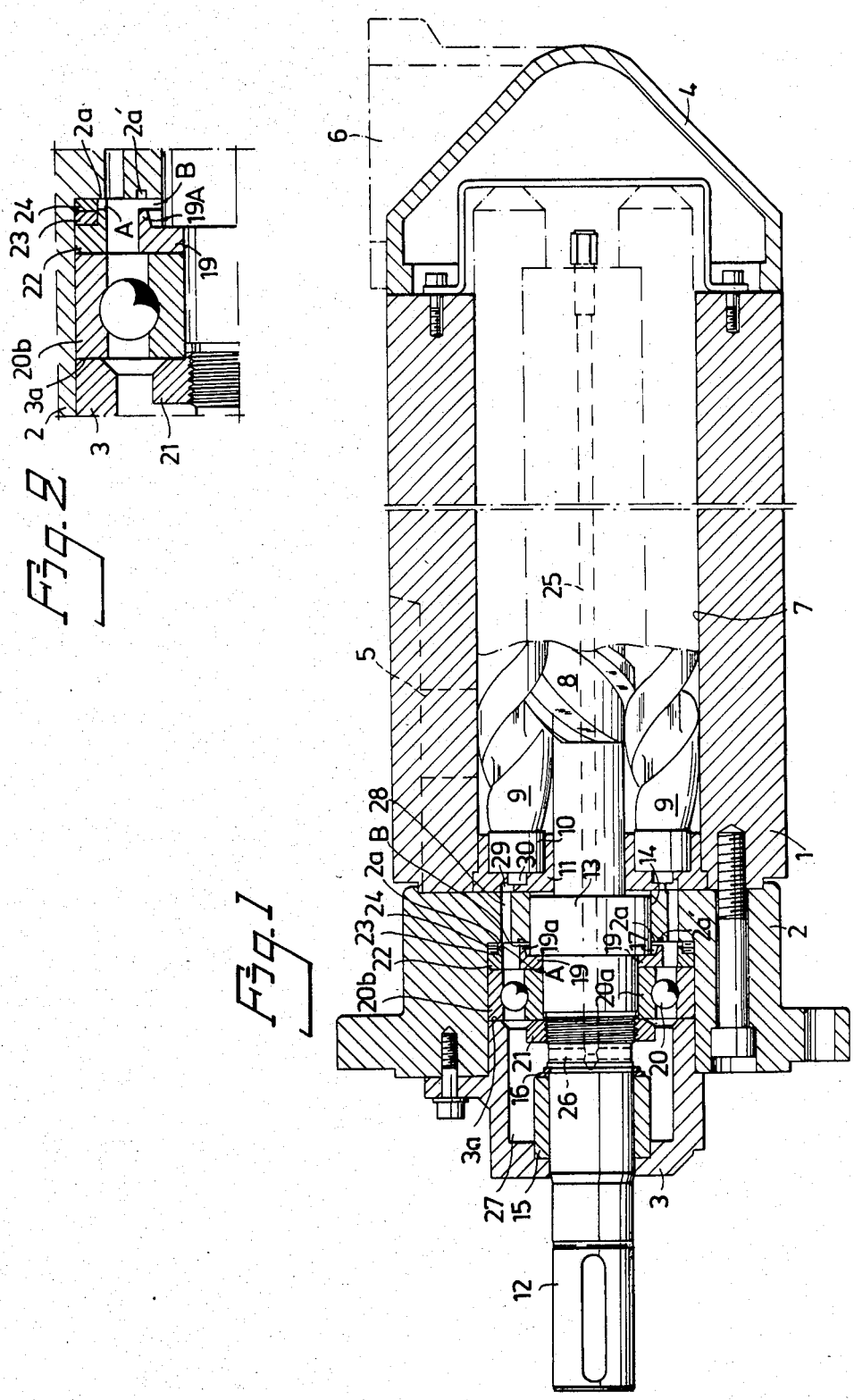

HYDRAULIC SCREW MACHINE

BACKGROUND OF THE INVENTION

1. Field of the Invention

The present invention relates to such hydraulic machines that include a screw array in the form of a drive screw and one or more running screws mounted in a housing, and implemented such that the screws seal against each other and the housing, while forming chambers which are displaced axially along the screw array during the rotation of the screws. The machine may work as a pump if the drive screw is driven by a motor, liquid being conveyed from the low pressure side to the high pressure side in the chambers formed by the screws and housing, or as a motor, liquid then being fed to the high pressure side and as it moves in the chambers to the low pressure side it drives the screws, so that the drive screw can drive an apparatus coupled to its shaft.

The screw array and housing are arranged in an exterior housing through which the drive screw shaft situated at the high pressure end extends under the intermediary of a seal. The drive screw shaft is provided with a balancing piston for balancing a part of the axial force acting on the screw, and also with a washer or collar which together with a wall portion of the housing forms a hydrostatic axial bearing for taking up the remaining axial force acting on the drive screw.

2. Description of the Prior Art

Hydraulic machines of the kind mentioned above are already known, e.g. from U.S. Pat. No. 4,131,400 to Segerstrom, issued Dec. 26, 1978. A disadvantage burdening the machine according to this published specification is that the radial mounting of the shaft on the high pressure side of the drive screw is unsatisfactory, particulary if the machine is driven by a motor, the shaft of which is not exactly in register with the shaft on the drive screw, since the plain bearings used in the machine have a limited ability of taking up forces from such misalignment. Another disadvantage is that the axial bearing arrangement for the shaft has also been unsatisfactory, particularly if the machine pumps cold oils and/or oils under low pressure, since oil is then not capable of penetrating into the gap defined by radial bearing surfaces on a part of the housing and a collar fastened to the shaft adjacent the balancing piston, resulting in large wear on the bearing surfaces. Further disadvantages are that the machine cannot be started with a large inlet pressure, since the mentioned collar will then engage with great friction against a sleeve attached to the other side of said housing part and cause wear on both these parts. In extreme cases parts of the machine such as the collar can even be destroyed.

SUMMARY OF INVENTION

It is an object of the present invention to improve previously known hydraulic screw machines of the kind described above and to provide a machine which is designed such that a satisfactory mounting is obtained both axially and radially in all prevailing operating situations.

This object is achieved by the invention having been given the distinguishing features disclosed in the characterizing portions of the claims.

BRIEF DESCRIPTION OF THE DRAWINGS

FIG. 1 is a side view, partly in section, of a hydraulic machine in accordance with the invention, and FIG. 2 is an enlarged view, in section, of a part of the machine illustrated in FIG. 1.

DETAILED DESCRIPTION OF THE PREFERRED EMBODIMENT

The hydraulic screw machine (which may either be a pump or a motor) includes a housing comprising a substantially cylindrical pump housing 1, an end member 2 at the left-hand end of the housing with a cover 3 attached to it by screws, and an end member 4 at the right-hand end of the pump housing, which is attached by screws (not shown) to housing 1. At its left-hand end the pump housing 1 is provided with an outlet chamber indicated by the numeral 5 and at its right-hand end with an inlet chamber indicated by the numeral 6.

An axial passage 7 extends between the inlet and outlet chambers and is conventionally formed as three intersecting, parallel, cylindrical bores, accommodating a drive screw 8 and two running screws 9, all three being arranged with their threads in mesh and sealing against each other as well as against the walls of the passage 7.

At the low pressure side the ends of the running screws 9 extend freely out into the inlet chamber, and their opposite ends are formed with balancing pistons 10 mounted in sleeves 11 inserted in the left-hand end of the pump housing 1. The end surfaces of the balancing pistons are subjected to pressure on the low pressure side in the manner described below, whereby the running screws are balanced.

The drive screw 8 is formed integrally with a drive shaft 12 extending out through the end member 2 and cover 3 so that it may be coupled to a drive motor or a driven device, depending on whether the machine is to operate as a pump or motor. In the portion thereof situated in the end member 2 the drive shaft is expanded to form a balancing piston 13, which with limited clearance to be axially displaceable within a central recess 14 in the end member.

An axial seal 15 is arranged between an abutment on the cover 3 and a ring 16 engaging against a shoulder on the shaft 12.

A balancing collar 19 surrounds the drive shaft 12 with its right face engaging against the left end surface of the balancing piston 13 and its left face engaging against the inner race 20a of a ball bearing 20, the left face of the inner race engaging against a nut 21 screwed onto a threaded portion of the shaft 12. The collar 19, inner race 20a and nut 21 are thus fixed on the shaft 12.

A washer 22 and the outer race 20b of the ball bearing 20 are also situated in the central recess of the end member 2, the washer and outer race being axially movable through a limited distance in the recess, which is axially defined by a radial inner surface 3a on the cover 3 and a radial abutment surface 2a on the end member 2. Two corrugated spring washers 23 and 24 mounted between the abutment surface 2a and outer ring 20b of ball bearing 20 urge the washer 22 and thereby the outer race 20b towards the surface 3a with a predetermined spring bias.

The drive screw 8 is provided with a longitudinal duct 25 extending from its end situated in the inlet chamber 6 up to a point in the drive shaft 12 where radial ducts 26 extend from the central duct 25 to the circumference of the drive shaft. Via the space 27 surrounded by the cover 3, the space between collar 19 and washer 22, axial ducts 28 in the end member 2 and ducts 29 in the sleeves 11 these ducts 26 are in communication with chambers 30 in the sleeves at the end surfaces of the balancing pistons 10, so that these end surfaces are subjected to the pressure prevailing on the low pressure side in inlet chamber 6, as mentioned above.

The pressure prevailing in the outlet chamber 5, which is normally substantially in excess of that prevailing in the inlet chamber 6, acts on the right end surface of the balancing piston 13 so that the drive shaft 12 is urged to the left as shown in the FIGS. 1 and 2, thereby partially counteracting the force directed to the right on the drive shaft coming from the hydraulic forces generated in the machine during operation. A further force strives to displace the drive shaft 12 to the left, namely the force occurring when liquid leaks in between the balancing piston 13 and the central recess 14 and thereupon enters under high pressure into a balancing chamber 17 disposed between the abutment surface 2a, the right face of the collar 19 and the peripheral surface of the balancing piston 13. This high pressure has a value lying between that of the pressure on the high and low pressure sides of the machine and varies along with the other hydraulic forces in the machine which act on the drive screw. During normal operation the drive shaft 12 is thus urged to the left, partly by the balancing piston 13 being directly acted on by the pressure in the outlet chamber 5 and partly by the variable pressure in the balancing chamber 17, whereby the collar 19 and thus the shaft 12 adjust themselves to a position such that necessary balance pressure is built up and the drive screw 8 is automatically balanced axially in the housing.

When the liquid pressure on the high pressure side of the machine is particularly low, which is the case during starting and/or when the liquid is thick and/or cold, the pressure in the balancing chamber 17 will be so low that the axial mounting location of the drive shaft 12 would be unsatisfactory and there would be a risk of damage to the end member 2 and/or the collar 19 if the bearing surfaces on them were not kept apart with the aid of the spring means formed by the spring washers 23, 24. The washer 22 is thus subjected to axial forces from the spring washers, this force being directed to the left in the FIGURES. The magnitude of the spring forces varies as the amount by which the spring washers is compressed, and these forces are transferred to the ball-bearing 20. Similarly, the ball-bearing 20 takes up axial forces acting to the left in the FIGURES on the shaft 12, if these forces become so great in an operational condition where the gap B achieves maximum width.

The ball-bearing 20 will also be able to take up axial forces directed to the right in the FIGURES in those cases where the hydrostatic axial bearing does not manage to build up a pressure sufficiently great for balancing. Such an operational condition can occur if the gap B has become worn after long use, e.g. due to flow erosion, and has become so wide that the possibility of pressure build-up in the balancing chamber 17 is reduced. If there is such wear, the ball-bearing will take up an increasing part of the axial force.

The spring washers 23 and 24 thus have the primary function of keeping the collar 19 and washer 22 away from the surface 2a when the pressure in the balancing chamber 17 is low, thereby reducing the risk of seizure which otherwise will occur if the collar 19 were urged against the surface 2a. The washers 23 and 24 also have the function of preventing the washer 22 and the outer race 20b of the ball-bearing 20 from rotating when the drive shaft 12 rotates. The washers 23 and 24 also result in the running-in, described in the following, of the outlet in forming gap B from the balancing chamber 17 achieves a more uniform width, since it thus ensured that liquid from chamber 17 will be introduced into the gap B during running-in.

Since it is very difficult to manufacture and assemble the parts of the machine so that the gap B in particular has an exactly equal width around its entire circumference, the balancing collar 19 is formed with an annular projection 19a consisting of a material harder than the material in the outer layer of surface 2a of the end member 2, and projection 19a is situated some 10ths of a millimeter closer to the surface 2a than the right end surface of the washer 22. During initial running-in of the machine the collar 19 and wall portion provided by surface 2a are lapped to each other when the drive shaft 12 rotates while it is urged to the right in the FIGURES against the bias of the spring washers 23 and 24. Thus the projection 19a will wear an annular groove 2a' in the surface 2a. The wear continues until the gap A between the washer 22 and surface 2a is equal to zero, when the washer 22 will come into engagement against the surface 2a, and thus the washer 22 and ball-bearing 20 will take up the continued axial forces directed to the right and acting on the drive shaft. By the wear thus achieved, during running-in, it is ensured that the gap B has an exactly uniform width along its entire circumference independent of imperfections in initial manufacture and assembly of the machine details, such as twist and lack of flatness, which would otherwise interfere with the function of the hydrostatic bearing at the gap B.

Although only one embodiment of the invention has been described above and illustrated on the drawings it will be understood that the invention is not limited to this embodiment and is only limited by the disclosures in the claims.

What is claimed as new and desired to be secured by letters patent of the United States is:

1. A hydraulic screw machine including:
   a drive screw;
   at least one running screw coacting with said drive screw;
   a housing enclosing said drive screw and said running screw, said housing having an outlet chamber defining a high pressure side of said machine and an inlet chamber;
   a shaft on said drive screw extending out through said housing on said high pressure side of said machine, said shaft being provided with a balancing piston for balancing a part of the axial forces acting on said drive screw;
   a first collar on said shaft facing a radially extending wall portion of said housing to define with said balancing piston a balancing chamber forming a hydrostatic axial bearing with bearing surfaces to take up the remaining axial forces acting on said drive screw, characterized in that:
   a second collar is arranged radially surrounding said first collar;
   spring means is arranged between said second collar and said wall portion; and
   a roller bearing is mounted in said housing having inner and outer bearing rings with said outer ring being mounted in said housing for limited axial movement, said inner bearing ring being secured on said shaft with said first collar being held between said balancing piston and said inner bearing ring, and said first collar being held separated from said wall portion by said spring means, said second collar and the axially movable outer ring of said roller bearing when too low a pressure prevails in said balancing chamber.

2. A screw machine as claimed in claim 1, wherein said hydrostatic axial bearing combines with said roller bearing that is capable of having limited axial movement, to take up a part of the axial forces acting on said drive screw directed from the shaft towards said drive screw during operating conditions where said axial bearing fails to build up a sufficiently large balancing pressure to balance out the entire axial force acting on the drive screw.

3. A screw machine as claimed in claim 1, wherein said hydrostatic axial bearing combines with said roller bearing that is capable of limited axial movement to take up axial forces acting on said drive screw directed from the drive screw towards the shaft.

4. A screw machine as claimed in claim 2 or 3, wherein the axial movement capability of said roller bearing before initial machine operation is greater than the distance between said first collar and said wall portion, and that said first collar and said wall portion are lapped to each other by wear during initial running-in operation.

* * * * *